United States Patent
Zhu et al.

(10) Patent No.: US 11,838,930 B2
(45) Date of Patent: Dec. 5, 2023

(54) MULTI-TASK JOINT COMPUTING UNLOADING AND RESOURCE ALLOCATION METHOD BASED ON D2D COMMUNICATION

(71) Applicant: NANJING UNIVERSITY OF POSTS AND TELECOMMUNICATIONS, Nanjing (CN)

(72) Inventors: Qi Zhu, Nanjing (CN); Yuelin Han, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/154,933

(22) Filed: Jan. 16, 2023

(65) Prior Publication Data
US 2023/0239903 A1 Jul. 27, 2023

Related U.S. Application Data

(63) Continuation of application No. PCT/CN2022/107287, filed on Jul. 22, 2022.

(30) Foreign Application Priority Data

Jan. 27, 2022 (CN) .......................... 202210101461.2

(51) Int. Cl.
*H04W 72/00* (2023.01)
*H04W 72/40* (2023.01)
*H04W 28/16* (2009.01)

(52) U.S. Cl.
CPC ........... *H04W 72/40* (2023.01); *H04W 28/16* (2013.01)

(58) Field of Classification Search
None
See application file for complete search history.

(56) References Cited

U.S. PATENT DOCUMENTS

2017/0013495 A1* 1/2017 Chae ................. H04W 52/0296
2018/0183855 A1* 6/2018 Sabella ............. H04W 52/0264
(Continued)

FOREIGN PATENT DOCUMENTS

CN 111586696 A 8/2020
CN 114449490 A 5/2022

OTHER PUBLICATIONS

EEE Communications Surveys & Tutorials, vol. 19, No. 3, Third Quarter 2017 Mobile Edge Computing: A Survey on Architecture and Computation Offloading Pavel Mach, Member, IEEE, and Zdenek Becvar, Member, IEEE (Year: 2017).*

(Continued)

*Primary Examiner* — Hassan A Phillips
*Assistant Examiner* — Gautam Sharma
(74) *Attorney, Agent, or Firm* — Nitin Kaushik

(57) ABSTRACT

The present disclosure discloses a multi-task joint computing unloading and resource allocation method based on D2D (Device-to-Device) communication. For solving the problems that computing resources of a local terminal cannot complete all computing tasks on time when there are multiple computing tasks with delay requirements on a local terminal, the method introduces a computing unloading mechanism to reduce the delay and the overhead of the local terminal itself. The method is based on a D2D communication technology. In the scenario where mobile terminals are densely distributed, the local terminal can unload the computing tasks at the same time to several surrounding idle terminals for processing. According to the method, a total (Continued)

overhead objective function is established in consideration of the task delay, energy consumption, and unloading fee.

4 Claims, 3 Drawing Sheets

(56) References Cited

U.S. PATENT DOCUMENTS

| | | | | |
|---|---|---|---|---|
| 2019/0138934 A1* | 5/2019 | Prakash | ............... | G06F 9/5072 |
| 2019/0158300 A1* | 5/2019 | Sabella | ............... | H04L 67/10 |
| 2019/0364492 A1* | 11/2019 | Azizi | ............... | H04W 4/029 |
| 2021/0266834 A1* | 8/2021 | Hu | ............... | H04W 4/46 |
| 2022/0007310 A1* | 1/2022 | Najla | ............... | H04W 52/383 |
| 2022/0386094 A1* | 12/2022 | Vemuri | ............... | H04W 8/24 |

OTHER PUBLICATIONS

EEE Transactions on Wireless Communications, vol. 17, No. 3, Mar. 2018 Joint Offloading and Computing Optimization in Wireless Powered Mobile-Edge Computing Systems Feng Wang, Member, IEEE, Jie Xu, Member, IEEE, Xin Wang, Senior Member, IEEE, (Year: 2018).*

* cited by examiner

1: Start
2: A local terminal detects surrounding idle terminals and channel states
3: Construct decision samples
4: Randomly select an execution position n for each computing task
5: Whether a computing task m is executed locally
6: Whether an idle terminal n satisfies the energy consumption limit
7: Whether the allocation of all computing tasks is completed
8: Yes
9: No

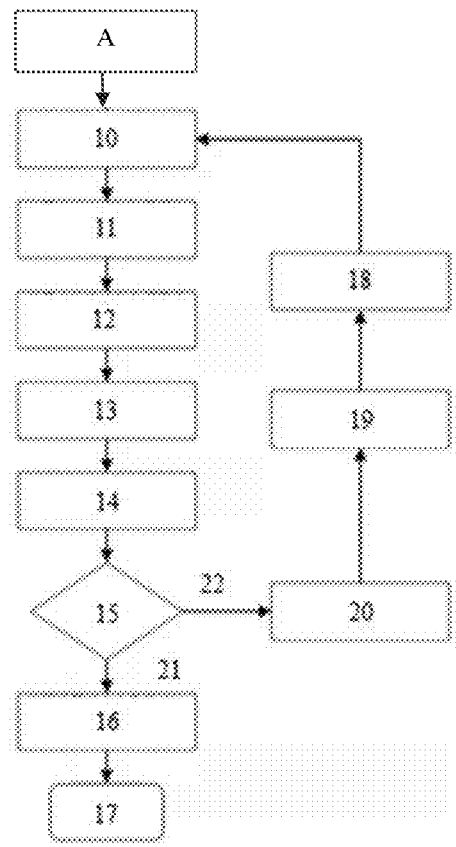

10: Obtain a computing task execution queue on each terminal according to the delay magnitude of the computing tasks 11: Calculate the upper limit of the computing task transmission delay between the local terminal and the idle terminals 12: Calculate the lower limit of the computing task transmission delay between the local terminal and the idle terminals 13: Calculate the optimal transmission delay corresponding to decision samples 14: Calculate the total overhead of each decision sample according to the optimal transmission delay 15: Whether the maximum number of iterations is reached 16: Recover the optimal computing task unloading decision in decision samples and the corresponding transmission delay 17: End 18: Calculate the total overhead of each decision sample and select a new sample group 19: Perform mutation operation on decision samples 20: Perform cross-operation between decision samples 21: Yes 22: No

FIG. 1B

MULTI-TASK JOINT COMPUTING UNLOADING AND RESOURCE ALLOCATION METHOD BASED ON D2D COMMUNICATION

CROSS-REFERENCE TO RELATED APPLICATIONS

The application claims priority to Chinese patent application No. 202210101461.2, filed on Jan. 27, 2022, the entire contents of which are incorporated herein by reference.

TECHNICAL FIELD

The present disclosure relates to the technical field of communication, and in particular to a multi-task joint computing unloading and resource allocation method based on D2D (Device-to-Device) communication.

BACKGROUND

The rapid development of mobile networks and smart devices provides a large number of service applications for people's daily life, but at the same time, these applications also produce a large number of computing-intensive tasks. Especially with the emergence of virtual reality, face recognition, and environmental interactive applications, the limited computing power of mobile terminal equipment is difficult to meet complex tasks with a large amount of computation and delay sensitivity. Mobile edge computing (MEC) is considered as an effective technology to address this challenge. MEC provides cloud computing capability in the radio access network (RAN) and connects users directly to the nearest edge computing server, which allows the needs of users to be met at any time and at any place. By unloading tasks to the edge computing server connected to the base station, users can get a better application experience. MEC servers have relatively high computing power, can complete tasks in a short time, and return the results to users.

In practice, mobile terminals are densely distributed, and each equipment has certain computing power. Users with relatively low computing power can unload their tasks to surrounding idle devices through device-to-device (D2D) communication. Compared with a MEC unloading scheme, the D2D technology can further enhance the user experience, make full use of the collaboration between mobile users, and effectively relieves the pressure on cellular networks in crowded scenes. In the scenario where user terminals have multi-task computing requirements, a reasonable task unloading decision and resource allocation scheme can effectively reduce the user's expenses.

SUMMARY

The present disclosure is aimed at providing a multi-task joint computing unloading and resource allocation method based on D2D (Device-to-Device) communication. The local terminal unloads several computing tasks generated by itself to several surrounding idle terminals at the same time, and the method is applied to reduce the overhead of the task delay, the energy consumption of the local terminal, and other aspects.

To realize the above function, the multi-task joint computing unloading and resource allocation method based on D2D (Device-to-Device) communication disclosed by the present disclosure executes the following steps according to a preset period to unload the computing tasks on the local terminal to all idle terminals with idle computing resources around the local terminal and realize the allocation of the computing tasks of the local terminal with the minimum total overhead.

S1. The idle terminals in a preset range are detected by taking the local terminal as the center, and the computing power $f_n$, energy consumption pricing $\varphi_n$, maximum allowable energy consumption $E_{max}^n$, and channel state $g_n$ of the idle terminals are obtained, where $n \in \{1,2,\ldots,N\}$, and N represents the total number of idle terminals.

S2. Based on the execution mode of the computing tasks on the local terminal, decision samples are constructed.

S3. Respectively for the decision samples, based on the processing delay function $t_m$ of the computing tasks, where $m \in \{1,2,\ldots,M\}$, M represents the total number of computing tasks, the total computing energy consumption function $E_{loc}$ for the local terminal processing the computing tasks assigned by the decision tasks, the transmission energy consumption function $E_n^{tran}$ for the idle terminals involved in the decision samples respectively receiving the computing tasks assigned by the decision samples, where $n \in \{1,2,\ldots,N\}$, N represents the total number of idle terminals, and the fee charging function for the idle terminals respectively receiving the computing tasks of the local terminal, the total overhead objective function and constrain conditions of the local terminal corresponding to the decision samples is determined.

S4. Respectively for the decision samples, the upper limit of the transmission delay between the local terminal corresponding to the decision samples and the idle terminals and the lower limit of the delay between the local terminal and the idle terminals are calculated, and the optimal transmission delay function corresponding to the decision samples is determined under constraint conditions:

respectively for the decision samples, the total overhead of the local terminal corresponding to the decision samples is calculated based on the total overhead objective function and constraint conditions of the local terminal corresponding to the decision samples and the optimal transmission delay function corresponding to the decision samples under the constraint conditions.

S5. The decision samples that minimize the total overhead of the local terminal are selected with the goal of minimizing the total overhead of the local terminal through a preset number of iterations, and the allocation of the computing tasks on the local terminal is completed based on the decision samples.

A preferred technical scheme of the invention is as follows: the specific steps of constructing decision samples in step S2 are as follows:

S21, computing tasks on a local terminal are represented by a set $\Gamma = \{T_1, T_2, \ldots T_M\}$, wherein the total number of the computing tasks is represented by M; the attributes of the computing tasks are represented by a set $\{C_m, D_m, L_m\}$, wherein $C_m$ represents the total number of CPU cycles required to process the computing tasks, $D_m$ represents the data volume of the computing tasks, $L_m$ represents the maximum delay allowed by the computing tasks, wherein $m \in \{1,2,\ldots,M\}$, and M represents the total number of computing tasks;

S22, idle terminals are sorted and numbered in descending order according to channel gains thereof, the channel gains of the idle terminals satisfy the requirement of $g_1 \geq \ldots \geq g_n \geq \ldots \geq g_N$, wherein $g_n$ represents the channel gain of one of the idle terminals, $n \in \{1,2,\ldots,N\}$, N represents the total number of idle terminals, and the idle terminals are presented by a set $\Lambda=\{1,2,\ldots,N\}$;

S23, respectively for one computing task $T_m$ among the computing tasks on the local terminal, wherein $m\in\{1, 2, \ldots, M\}$, and M represents the total number of computing tasks, the execution mode of the computing task $T_m$ is constructed as follows:

$\{x_{m,0}, x_{m,1}, \ldots, x_{m,n}, \ldots, x_{m,N}\}$ where $x_{m,n}$ represents the execution mode of the computing task $T_m$, wherein $n\in\{1,2,\ldots,N\}$, N represents the total number of idle terminals, $x_{m,0}=1$ represents that the computing task $T_m$ is processed at the local terminal, $x_{m,0}=0$ represents that the computing task $T_m$ is not processed at the local terminal, $x_{m,n}=1$ represents that computing task $T_m$ is unloaded to the idle terminal n for processing, $x_{m,n}=0$ represents that the computing task $T_m$ is not processed on the idle terminal n, and the execution mode of each computing task in computing task sets on the local terminal satisfies $\Sigma_{n=0}^{N}x_{m,n}=1$; and S24, respectively for the computing tasks on the local terminal, the decision samples are constructed based on the execution mode of the computing tasks on the local terminal, each of the decision samples is represented by a matrix A with M rows and N+1 columns, and the matrix A is as follows:

$$A = \begin{pmatrix} x_{1,0} & x_{1,1} & x_{1,2} & \cdots & x_{1,N} \\ x_{2,0} & x_{2,1} & x_{2,2} & \cdots & x_{2,N} \\ \vdots & \vdots & \vdots & \vdots & \vdots \\ x_{M,0} & x_{M,1} & x_{M,2} & \cdots & x_{M,N} \end{pmatrix}$$

wherein the first column in the matrix A represents the execution condition of the computing tasks on the local terminal, and the second column to the (N+1)-th column represent the execution condition of the computing tasks unloaded to the idle terminals.

A preferred technical scheme of the invention is as follows: the specific steps of determining the total overhead objective function and constraint conditions of the local terminal in step 3 are as follows:

S31, respectively for each decision sample, the number of computing tasks on the local terminal and the idle terminals is represented by a set $\{K_0, K_1, \ldots, K_N\}$, and the computing tasks on the local terminal are arranged in descending order according to the maximum allowable delay $L_m$, and are represented by a set $S_0=\{S_{0,1}, S_{0,2}, \ldots, S_{0,K_0}\}$; the computing tasks on the idle terminal n are arranged in descending order according to the maximum allowable delay $L_m$, and are represented by a set $S_n=\{S_{n,1}, S_{n,2}, \ldots, S_{n,K_n}\}$;

S32, the total computing energy consumption function $E_{loc}$ for the local terminal processing the computing tasks assigned by the decision tasks is calculated, and the transmission energy consumption function $E_n^{tran}$ for the idle terminals involved in the decision samples respectively receiving the computing tasks assigned by the decision samples are as follows:

$E_{loc}=\Sigma_{m=1}^{M}x_{m,0}\mu C_m$ $E_n^{tran}=t_{tran}\cdot P^{tot}$ where $\mu$ represents the energy consumed in each CPU cycle, $t_{tran}$ represents the transmission time for the local terminal to unload the computing tasks to the idle terminals, and $P^{tot}$ represents the minimum total transmission power of the local terminal;

wherein the decision x is executed based on the computing tasks corresponding to the decision samples, and the relationship between the transmission time $t_{tran}$ for the local terminal to unload the computing tasks to the idle terminals and the minimum total transmission power $P^{tot}$ of the local terminal is as follows:

$$P^{tot}(x, t_{tran}) = Wn_0 \sum_{n=1}^{N}\left(\frac{1}{g_n} - \frac{1}{g_{n-1}}\right)2^{\frac{1}{t_{tran}W}\Sigma_{k=n}^{N}\Sigma_{m=1}^{M}x_{m,k}D_m} - \frac{Wn_0}{g_N}$$

where $g_n$ represents the n-th idle terminal, $g_{n-1}$ represents the (n−1)-th idle terminal, $g_N$ represents the N-th idle terminal, and $g_{n-1}\geq g_n\geq g_N$, W represents the bandwidth of a transmission channel, $n_0$ represents the power spectral density of white noise, and k represents the serial number of the idle terminal;

S33, one computing task $T_m$ among the computing tasks on the local terminal is unloaded to the idle terminal n, and the expression of the processing delay $t_m$ of the computing task $T_m$ is as follows:

$$t_m = \begin{cases} \sum_{k=S_{0,1}}^{S_0(m)} \frac{C_i}{f_{loc}} & x_{m,n}=1, n=0 \\ t_{tran} + \sum_{k=S_{n,1}}^{S_n(m)} \frac{C_i}{f_n} & x_{m,n}=1, n\in A \end{cases}$$

where $f_{loc}$ represents the computing power of the local terminal, $f_n$ represents the computing power of the idle terminals, $S_n(m)$ represents the position of the computing task $T_m$ in the set $S_n$, $S_0(m)$ represents the position of the computing task $T_m$ in the set $S_0$ and i represents the serial number of the computing tasks in the set $S_0$ or the $S_n$;

S34, a fee-charging function $Mon_n$ for the idle terminals respectively receiving the computing tasks of the local terminal is calculated as follows:

$Mon_n=\varphi_n \log_2(1+\Sigma_{i=S_{n,1}}^{S_n,K_n}\mu C_i)$ where $\varphi_n$ represents the pricing of unit energy consumption of the idle terminal n;

S34, based on the processing delay $t_m$ of the computing task $T_m$, the total computing energy consumption function $E_{loc}$ for the local terminal processing the computing tasks assigned by the decision tasks, the transmission energy consumption function $E_n^{tran}$ for the idle terminals involved in the decision samples respectively receiving the computing tasks assigned by the decision samples, and the fee-charging function $Mon_n$ for the idle terminals respectively receiving the computing tasks of the local terminal, the total overhead objective function of the local terminal corresponding to the decision samples is determined as follows:

$$\underset{x,t_{tran}}{\text{minimize}}\ \alpha\max t_m + \beta(E_{loc}+E_n^{tran}) + \gamma\sum_{n=1}^{N} Mon_n$$

constraint conditions are as follows:
(1) $t_m\leq L_m\ \forall m\in\{1,2,\ldots,M\}$
(2) $\Sigma_{m=S_{n,1}}^{S_n,K_n}\mu C_m\leq E_{max}^n\ \forall n\in\Lambda$
(3) $P^{tot}\leq P_{max}$
(4) $\alpha+\beta+\gamma=1$ (5) $\alpha, \beta, \gamma \in (0, 1)$, $t_{tran} > 0$, $x_{m,n} \in \{0,1\}$ where $P_{max}$ represents the maximum transmission power of the local terminal, $E_{max}^n$ represents the maximum allowable energy consumption of the idle terminal n, and $\alpha$, $\beta$, and $\gamma$ respectively represent the weight coefficients of the local terminal for the processing delay, the energy consumption, and the fee charging corresponding to the idle terminals respectively receiving the computing tasks of the local terminal.

A preferred technical scheme of the invention is as follows: the specific steps of determining the optimal transmission delay function corresponding to the decision samples in step S4 are as follows:

S41. respectively for each decision sample, the upper limit $t_{tran}^{up}$ of transmission delay between the local terminal and the idle terminals is calculated as follows:

$$t_{tran}^{up} = \min_{n \in \Lambda} \{\Delta_n\}$$

where $\Delta_n$ represents the upper limit of the transmission delay between the local terminal and the idle terminal n and is specifically shown in the following formula:

$$\Delta_n = \min_{m \in S_n} \{L_m - t'_m\}$$

where $t'_m$ represents the delay of the computing task $T_m$ on the local terminal or the idle terminals, and is specifically shown in the following formula:

$$t'_m = \begin{cases} \sum_{k=S_{0,1}}^{S_0(m)} \frac{C_i}{f_{loc}} & x_{m,0} = 1 \\ \sum_{k=S_{n,1}}^{S_n(m)} \frac{C_i}{f_n} & x_{m,n} = 1, n \in \Lambda \end{cases}$$

S42, based on the maximum transmission power $P_{max}$ of the local terminal, the lower limit $t_{tran}^{low}$ of transmission delay between the local terminal and the idle terminals is calculated according to the following formula:

$$P_{max} - Wn_0 \sum_{n=1}^{N} \left(\frac{1}{g_n} - \frac{1}{g_{n-1}}\right) 2^{\frac{1}{t_{tran}^{low} W} \sum_{k=n}^{N} \sum_{m=1}^{M} x_{m,k} D_m} - \frac{Wn_0}{g_N} = 0$$

S43, based on the maximum transmission power $P_{max}$ of the local terminal, the transmission delay $t'_{tran}$ which minimizes the total overhead of the local terminal corresponding to the decision samples is calculated according to the following formula:

$$\alpha - \beta \frac{Wn_0}{g_N} + \beta n_0 \sum_{n=1}^{N} \left(\frac{1}{g_n} - \frac{1}{g_{n-1}}\right)$$

$$2^{\frac{1}{t'_{tran} W} \sum_{k=n}^{N} \sum_{m=1}^{M} x_{m,k} D_m} \left(W - \ln 2 \cdot \frac{1}{t'_{tran}} \sum_{k=n}^{N} \sum_{m=1}^{M} x_{m,k} D_m\right) = 0$$

S44, based on the upper limit $t_{tran}^{up}$ of the transmission delay and the lower limit $t_{tran}^{low}$ of the transmission delay between the local terminal and the idle terminals, the optimal transmission delay function $t^*_{tran}$ is determined:

if $t_{tran}^{up} \geq t_{tran}^{low}$ and $t_{tran}^{low} \leq t'_{tran}$, $t^*_{tran} = \min\{t'_{tran}, t_{up}^{tran}\}$;  (1)

if $t_{tran}^{up} \geq t_{tran}^{low}$ and $t_{tran}^{low} > t'_{tran}$, $t^*_{tran} = t_{tran}^{low}$;  (2)

if $t_{tran}^{up} < t_{tran}^{low}$ and $\max_{m \in \Gamma}\{L_m - t'_m\} < t_{tran}^{low}$, $t^*_{tran} = \max\{t_{tran}^{low}, t'_{tran}\}$  (3)

if $t_{tran}^{up} < t_{tran}^{low}$ and $\max_{m \in \Gamma}\{L_m - t'_m\} \geq t_{tran}^{low}$,  (4)

according to the step S41, the transmission delay upper limit between the local terminal and the idle terminals is recalculated and is recorded as $t_{tran}^{up*}$;

(1) if $t_{tran}^{up*} < t'_{tran}$, $t^*_{tran} = t_{tran}^{up*}$;

(2) if $t_{tran}^{up*} \geq t'_{tran}$, $t^*_{tran} = \max\{t_{tran}^{low}, t'_{tran}\}$;

S45, the processing delay $t^*_m$ of the computing task $T_m$ based on the optimal transmission delay function $t^*_{tran}$ is obtained by bringing the optimal transmission delay function $t^*_{tran}$ into the processing delay $t^*_m$ expression of the computing task $T_m$, and based on the total overhead objective function of the local terminal corresponding to the decision samples, the total overhead of the local terminal corresponding to the decision samples is obtained as follows:

$$\alpha \max t^*_m + \beta E_{loc} + \gamma \sum_{n=1}^{N} Mon_n + \sigma \max_{m \in \{1,2,\ldots,M\}} \left\{\frac{\max\{t^*_m - L_m, 0\}}{|t^*_m - L_m|}\right\}$$

where $\sigma$ represents a preset penalty value.

A preferred technical scheme of the invention is as follows: the specific steps of selecting the decision samples that minimize the total overhead of the local terminal with the goal of minimizing the total overhead of the local terminal through a preset number of iterations and completing the allocation of the computing tasks on the local terminal in step S5 are as follows:

S51, different decision samples are used to participate in the iterations, the computing tasks on the local terminal are allocated according to the decision samples, the maximum number of iterations is preset, whether the preset maximum number of iterations is reached is determined, and if the preset maximum number of iterations is reached, the decision samples in each iteration that minimize the total overhead of the local terminal in each iteration are selected to allocate the computing tasks on the local terminal are allocated;

if the preset maximum number of iterations is not reached, step S52 is performed;

S52, cross-operation is performed in the decision samples: two decision samples are randomly selected from the decision samples, and are marked as $A_1$ and $A_2$, the decision samples reflect the execution decision of each task, N+1 columns of vectors in the decision samples are regarded as chromosomes, each chromosome contains M elements which correspondingly represent the execution condition of M tasks on the local terminal or the idle terminals, the decision samples $A_1$ and $A_2$ are respectively marked as a parent individual 1 and a parent individual 2, the positions of the chromosome and the position of a crossing node on the chromosome are randomly selected, and the expression is as follows:

$(\theta_1, \theta_2)$ where $\theta_1$ represents the position of the chromosome in the parent individual to which the chromosome belongs, and $\theta_2$ represents the position of the crossing node in the chromosome; based on this position, a cross interchange is performed, first $\theta_2$ elements on first $\theta_1-1$ columns and a $\theta_1$-th column of the parent individual 1 and last M-$\theta_2$ elements on last N+1-$\theta_1$ columns and a $\theta_1$-th column of the parent individual 2 are combined to generate a new individual 1, last M-$\theta_2$ elements on last N+1-01 columns and a $\theta_1$-th column of the parent individual 1 and first $\theta_2$ elements on first $\theta_1-1$ columns and a $\theta_1$-th column of the parent individual 2 are combined to generate a new individual 2, and the two new individuals are generated and are respectively marked as an offspring individual 1 and an offspring individual 2:

after each cross-operation is completed, whether each offspring individual satisfies $\Sigma_{n=0}^{N}x_{m,n}=1$ is checked, if $\Sigma_{n=0}^{N}x_{m,n}=0$, it means that the computing tasks are missing, for the missing computing tasks, the idle terminals or the local terminal which can execute the missing computing tasks are randomly selected, if $\Sigma_{n=0}^{N}x_{m,n}>1$, it means that the computing tasks are repeated, the idle terminals or the local terminal which can execute the repeated computing tasks are randomly selected;

S53, the mutation claim operation is implemented in the decision samples: based on the decision samples in the completed iterations, the decision samples that minimize the total overhead of the local terminal do not participate in the mutation operation, for other decision samples, the mutation operation is performed with a preset probability $\hat{m}$, for the matrix corresponding to the decision sample, the position of the chromosome and the position of a mutation element on the chromosome are randomly selected, and the expression is as follows:

$(\theta_3, \theta_4)$ where $\theta_3$ represents the position of the chromosome in the individual to which the chromosome belongs, and $\theta_4$ represents the position of the mutant element on the chromosome;

$x_{(\theta_3, \theta_4)}$ represent the value of the element on the chromosome, if $x_{(\theta_3, \theta_4)}=1$, the value of the element is modified to 0, and the idle terminal or local terminal that executes the computing task to which the element corresponds is randomly selected, if $x_{(\theta_3, \theta_4)}=0$, the value of the element is modified to 1, the computing task to which the element corresponds is removed from the idle terminal or the local terminal that originally executed the computing task; and S54, for the decision samples, and other decision samples obtained through cross-operation and mutation operation, the total overhead of the local terminal corresponding to the decision samples is calculated, and the optimal original population number of samples are selected to build a sample group to participate in iterations until the preset maximum number of iterations is reached.

Compared with the prior art, the present disclosure has the following beneficial effects and advantages:

1. The present disclosure is aimed at maximizing the number of completed computing tasks; and the delay of the computing tasks is minimized by decentralizing and unloading the computing tasks to the different idle terminals, which ensures to the greatest extent that each computing task can be completed within the maximum delay allowed by the computing task.

2. According to the present disclosure, the overhead of the local terminal in the aspects of computing task delay, energy consumption, unloading fee, and the like are jointly considered, and the aspects are jointly optimized, so that users can adjust the definition of their overhead according to the emphasis on different resources.

3. Different from the traditional method of unloading computing tasks, the method makes full use of the computing resources of surrounding idle terminals, can unload multiple computing tasks to one terminal equipment at the same time, and may also unload multiple computing tasks to multiple terminal equipment at the same time with relatively high flexibility.

DETAILED DESCRIPTION OF THE EMBODIMENTS

The present disclosure will be further described with reference to the accompanying drawings. The following embodiments are only used to illustrate the technical scheme of the present disclosure more clearly, and cannot be used to limit the scope of protection of the present disclosure.

Figure 1A:
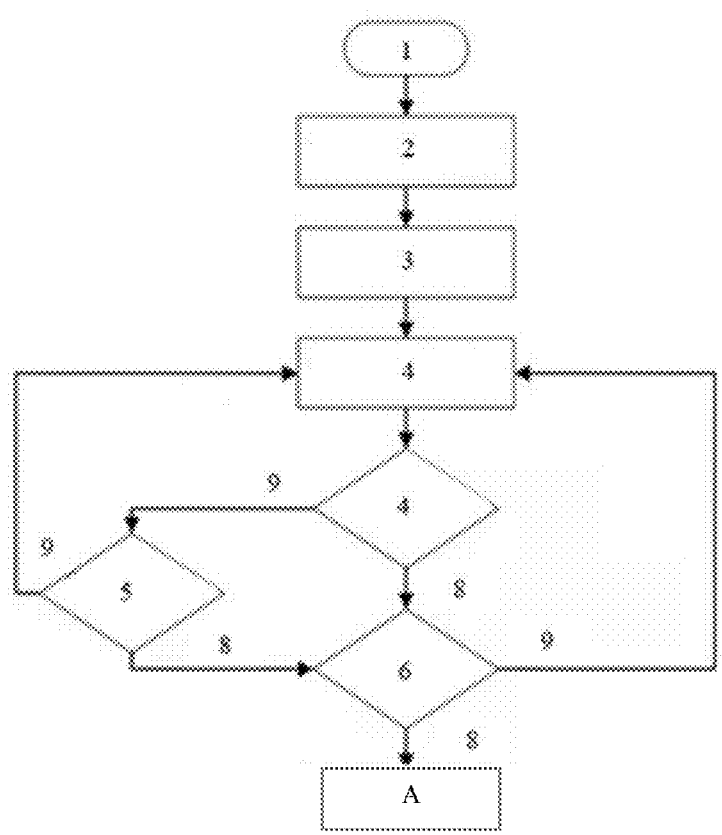
FIG. 1 is a schematic flow diagram provided by an embodiment of the present disclosure.
Figure 2:
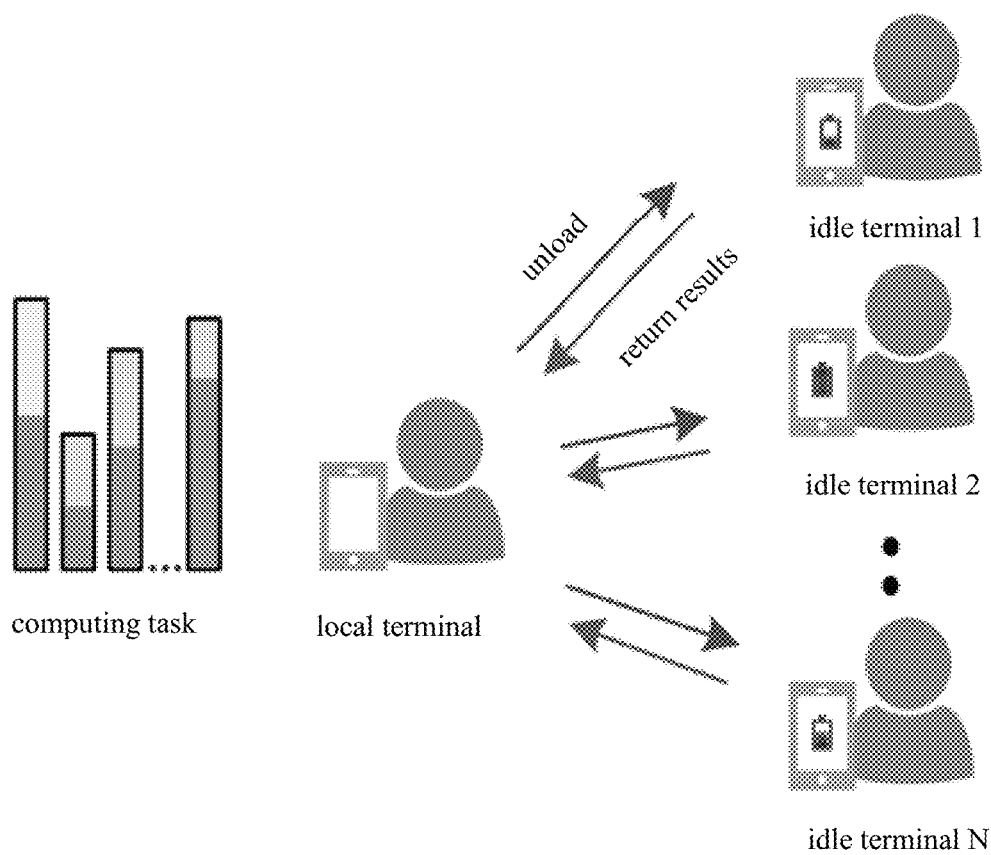
FIG. 2 is a schematic diagram of a system model by an embodiment of the present disclosure.

Referring to FIG. 1 and FIG. 2, the multi-task joint computing unloading and resource allocation method based on D2D (Device-to-Device) communication disclosed by the embodiment of the present disclosure executes the following steps according to a preset period to unload computing tasks on a local terminal to idle terminals with idle computing resources around the local terminal and realize the allocation of the computing tasks of the local terminal with the minimum total overhead of the local terminal. The D2D communication of the local terminal has the longest distance of 50 m.

S1. Idle terminals in a preset range are detected by taking the local terminal as the center, and the computing power $f_n$, energy consumption pricing $\varphi_n$, maximum allowable energy consumption $E_{max}^n$, and channel state $g_n$ of the idle terminals are obtained, where $n \in \{1,2, \ldots, N\}$, and N represents the total number of idle terminals.

S2. Based on the execution mode of the computing tasks on the local terminal, decision samples are constructed.

S3. Respectively for the decision samples, based on the processing delay function $t_m$ of the computing tasks, where $m \in \{1,2, \ldots, M\}$, M represents the total number of computing tasks, the total computing energy consumption function $E_{loc}$ for the local terminal processing the computing tasks assigned by the decision tasks, the transmission energy consumption function $E_n^{tran}$ for the idle terminals involved in the decision samples respectively receiving the computing tasks assigned by the decision samples, where $n \in \{1,2, \ldots, N\}$, N represents the total number of idle terminals, and the fee charging function for the idle terminals respectively receiving the computing tasks of the local terminal, the total overhead objective function and constraint conditions of the local terminal corresponding to the decision samples are determined.

S4. Respectively for the decision samples, the upper limit of the transmission delay between the local terminal corresponding to the decision samples and the idle terminals and the lower limit of the delay between the local terminal and the idle terminals are calculated, and the optimal transmission delay function corresponding to the decision samples is determined under constraint conditions; and respectively for the decision samples, the total overhead of the local terminal corresponding to the decision samples is calculated based on the total overhead objective function and constraint conditions of the local terminal corresponding to the decision samples and the optimal transmission delay function corresponding to the decision samples under the constraint conditions.

S5. The decision samples that minimize the total overhead of the local terminal are selected with the goal of minimizing the total overhead of the local terminal through a preset number of iterations, and the allocation of the computing tasks on the local terminal is completed based on the decision samples.

According to the multi-task joint computing unloading and resource allocation method based on D2D (Device-to-Device) communication disclosed by the embodiment of the present disclosure, the specific steps of constructing decision samples in step S2 are as follows:

S21, computing tasks on a local terminal are represented by a set $\Gamma=\{T_1, T_2, \ldots T_M\}$, wherein the total number of the computing tasks is represented by M, the attributes of the computing tasks are represented by a set $\{C_m, D_m, L_m\}$, wherein $C_m$ represents the total number of CPU cycles required to process the computing tasks, $D_m$ represents the data volume of the computing tasks, $L_m$ represents the maximum delay allowed by the computing tasks, wherein $m\in\{1,2,\ldots,M\}$, and M represents the total number of computing tasks;

S22, idle terminals are sorted and numbered in descending order according to channel gains thereof, the channel gains of the idle terminals satisfy the requirement of $g_1\geq\ldots\geq g_n\geq\ldots\geq g_N$, wherein $g_n$ represents the channel gain of one of the idle terminals, $n\in\{1,2,\ldots,N\}$, N represents the total number of idle terminals, and the idle terminals are presented by a set $\Lambda=\{1,2,\ldots,N\}$;

S23, respectively for one computing task $T_m$ among the computing tasks on the local terminal, wherein $m\in\{1, 2, \ldots, M\}$, and M represents the total number of computing tasks, the execution mode of the computing task $T_m$ is constructed as follows:

$\{x_{m,0}, x_{m,1}, \ldots x_{m,n}, \ldots x_{m,N}\}$, where $x_{m,n}$ represents the execution mode of the computing task $T_m$, wherein $n\in\{1,2,\ldots,N\}$, N represents the total number of idle terminals, $x_{m,0}=1$ represents that the computing task $T_m$ is processed at the local terminal, $x_{m,0}=0$ represents that the computing task $T_m$ is not processed at the local terminal, $x_{m,n}=1$ represents that computing task $T_m$ is unloaded to the idle terminal n for processing, $x_{m,n}=0$ represents that the computing task $T_m$ is not processed on the idle terminal n, and the execution mode of each computing task in computing task sets on the local terminal satisfies $\Sigma_{n=0}^{N}x_{m,n}=1$, that is, each computing task can only be processed on an idle terminal or the local terminal; and S24, respectively for the computing tasks on the local terminal, the decision samples are constructed based on the execution mode of the computing tasks on the local terminal, each of the decision samples is represented by a matrix A with M rows and N+1 columns, and the matrix A is as follows:

$$A = \begin{pmatrix} x_{1,0} & x_{1,1} & x_{1,2} & \cdots & x_{1,N} \\ x_{2,0} & x_{2,1} & x_{2,2} & \cdots & x_{2,N} \\ \vdots & \vdots & \vdots & \vdots & \vdots \\ x_{M,0} & x_{M,1} & x_{M,2} & \cdots & x_{M,N} \end{pmatrix}$$

wherein the first column in the matrix A represents the execution condition of the computing tasks on the local terminal, and the second column to the (N+1)-th column represent the execution condition of the computing tasks unloaded to the idle terminals, and when the decision sample of one computing task is constructed, whether the idle terminals satisfy energy consumption limit is determined.

According to the multi-task joint computing unloading and resource allocation method based on D2D (Device-to-Device) communication disclosed by the embodiment of the present disclosure, the specific steps of determining the total overhead objective function and constraint conditions of the local terminal in step 3 are as follows:

S31, respectively for each decision sample, the number of computing tasks on the local terminal and the idle terminals is represented by a set $\{K_0, K_1, \ldots, K_N\}$, the computing tasks are processed on the idle terminals or the local terminal in a serial mode, and the computing tasks on the local terminal are arranged in descending order according to the maximum allowable delay $L_m$, and are represented by a set $S_0=\{S_{0,1}, S_{0,2}, \ldots, S_{0,K_0}\}$; the computing tasks on the idle terminal n are arranged in descending order according to the maximum allowable delay $L_m$, and are represented by a set $S_n=\{S_{n,1}, S_{n,2}, \ldots, S_{n,K_n}\}$;

S32, the total computing energy consumption function $E_{loc}$ for the local terminal processing the computing tasks assigned by the decision tasks is calculated, and the transmission energy consumption function $E_n^{tran}$ for the idle terminals involved in the decision samples respectively receiving the computing tasks assigned by the decision samples are as follows:

$E_{loc}=\Sigma_{m=1}^{M}x_{m,0}\mu C_m$, $E_n^{tran}=t_{tran}\cdot P^{tot}$, where $\mu$ represents the energy consumed in each CPU cycle, $t_{tran}$ represents the transmission time for the local terminal to unload the computing tasks to the idle terminals, and $P^{tot}$ represents the minimum total transmission power of the local terminal;

wherein the decision x is executed based on the computing tasks corresponding to the decision samples, and the relationship between the transmission time $t_{tran}$ for the local terminal to unload the computing tasks to the idle terminals and the minimum total transmission power $P^{tot}$ of the local terminal is as follows:

$$P^{tot}(x, t_{trean}) = Wn_0\sum_{n=1}^{N}\left(\frac{1}{g_n}-\frac{1}{g_{n-1}}\right)2^{\frac{1}{t_{tran}W}\Sigma_{k=n}^{N}\Sigma_{m=1}^{M}x_{m,k}D_m} - \frac{Wn_0}{g_N}$$

where $g_n$ represents the n-th idle terminal, $g_{n-1}$ represents the (n−1)-th idle terminal, $g_N$ represents the N-th idle terminal, and $g_{n-1} \geq g_n \geq g_N$, W represents the bandwidth of a transmission channel, $n_0$ represents the power spectral density of white noise, and k represents the serial number of the idle terminal;

S33, one computing task $T_m$ among the computing tasks on the local terminal is unloaded to the idle terminal n, and the expression of the processing delay $t_m$ of the computing task $T_m$ is as follows:

$$t'_m = \begin{cases} \sum_{i=S_{0,1}}^{S_0(m)} \dfrac{C_i}{f_{loc}} & x_{m,0} = 1 \\ t_{tran} + \sum_{i=S_{n,1}}^{S_n(m)} \dfrac{C_i}{f_n} & x_{m,n} = 1, n \in \Lambda \end{cases},$$

where $f_{loc}$ represents the computing power of the local terminal, $f_n$ represents the computing power of the idle terminals, that is, the number of CPU cycles per second that the local terminal or the idle terminals can handle, $S_n(m)$ represents the position of the computing task $T_m$ in the set $S_n$, $S_0(m)$ represents the position of the computing task $T_m$ in the set $S_0$ and i represents the serial number of the computing task in the set $S_0$ or the $S_n$;

S34, while the local terminal unloads the computing tasks to the idle terminals, the local terminal needs to pay a fee to the idle terminals as a commission, a fee-charging function $Mon_n$ for the idle terminals respectively receiving the computing tasks of the local terminal is calculated as follows:

$$Mon_n = \varphi_n \log_2(1 + \Sigma_{i=S_{n,1}}^{S_n, K_n} \mu C_i),$$

where $\varphi_n$ represents the pricing of unit energy consumption of the idle terminal n, and is related to the maximum allowable energy consumption $E_{max}^n$ of the idle terminal n, the computing power $f_n$ of the idle terminal n, and the value emphasizing factor $\eta_n$ of the idle terminal n for energy, and the specific relationship is as follows:

$$\varphi_n = \dfrac{f_n}{E_{max}^n} \eta_n;$$

S34, based on the processing delay $t_m$ of the computing task $T_m$, the total computing energy consumption function $E_{loc}$ for the local terminal processing the computing tasks assigned by the decision tasks, the transmission energy consumption function $E_n^{tran}$ for the idle terminals involved in the decision samples respectively receiving the computing tasks assigned by the decision samples, and the fee-charging function $Mon_n$ for the idle terminals respectively receiving the computing tasks of the local terminal, the total overhead objective function of the local terminal corresponding to the decision samples is determined as follows:

$$\underset{x, t_{tran}}{\text{minimize}} \; \alpha \max t_m + \beta(E_{loc} + E_n^{tran}) + \gamma \sum_{n=1}^{N} Mon_n,$$

constraint conditions are as follows:

(1) $t_m \leq L_m \; \forall m \in \{1, 2, \ldots, M\}$
(2) $\Sigma_{m=S_{n,1}}^{S_n, K_n} \mu C_m \leq E_{max}^n \; \forall n \in \Lambda$
(3) $P^{tot} \leq P_{max}$
(4) $\alpha + \beta + \gamma = 1$
(5) $\alpha, \beta, \gamma \in (0, 1), t_{tran} > 0, x_{m,n} \in \{0,1\}$ where $P_{max}$ represents the maximum transmission power of the local terminal, $E_{max}^n$ represents the maximum allowable energy consumption of the idle terminal n, $\alpha$, $\beta$ and $\gamma$ respectively represent the weight coefficients of the local terminal for the processing delay, the energy consumption, and the fee charging corresponding to the idle terminals respectively receiving the computing tasks of the local terminal, the three aspects respectively reflect the local terminal's emphasis on the processing delay, the energy consumption and unloading fee, the formula (1) guarantees that all computing tasks must be completed within the maximum time limit of the computing tasks, the formula (2) limits the maximum energy of the idle terminals, which can be used for computing, the formula (3) is the limit for the transmission power of the local terminal, the formula (4) specifies the relationship among the processing delay coefficient, the energy consumption coefficient, and the unloading fee coefficient, and the formula (5) limits the range of values of $\alpha$, $\beta$, $\gamma$.

According to the multi-task joint computing unloading and resource allocation method based on D2D (Device-to-Device) communication disclosed by the embodiment of the present disclosure, the specific steps of determining the optimal transmission delay function corresponding to the decision samples in step S4 are as follows:

S41. respectively for each decision sample, the upper limit $t_{tran}^{up}$ of transmission delay between the local terminal and the idle terminals is calculated as follows:

$$t_{tran}^{up} = \min_{n \in \Lambda} \{\Delta_n\},$$

where $\Delta_n$ represents the upper limit of the transmission delay between the local terminal and the idle terminal n and is specifically shown in the following formula:

$$\Delta_n = \min_{m \in S_n} \{L_m - t'_m\},$$

where $t'_m$ represents the delay of the computing task $T_m$ on the local terminal or the idle terminals, and is specifically shown in the following formula:

$$t'_m = \begin{cases} \sum_{i=S_{0,1}}^{S_0(m)} \dfrac{C_i}{f_{loc}} & x_{m,0} = 1 \\ \sum_{i=S_{n,1}}^{S_n(m)} \dfrac{C_i}{f_n} & x_{m,n} = 1, n \in \Lambda \end{cases},$$

S42, based on the maximum transmission power $P_{max}$ of the local terminal, the lower limit $t_{tran}^{low}$ of transmission delay between the local terminal and the idle terminals is calculated according to the following formula:

$$P_{max} - W n_0 \sum_{n=1}^{N} \left( \dfrac{1}{g_n} - \dfrac{1}{g_{n-1}} \right) 2^{\frac{1}{t_{tran}^{low} W} \Sigma_{k=n}^{N} \Sigma_{m=1}^{M} x_{m,k} D_m} - \dfrac{W n_0}{g_N} = 0,$$

S43, based on the maximum transmission power $P_{max}$ of the local terminal, the transmission delay $t'_{tran}$ which minimizes the total overhead of the local terminal corresponding to the decision samples is calculated according to the following formula:

$$\alpha - \beta \frac{Wn_0}{g_N} + \beta n_0 \sum_{n=1}^{N}\left(\frac{1}{g_n} - \frac{1}{g_{n-1}}\right)$$

$$2^{\frac{1}{t'_{tran}W}\sum_{k=n}^{N}\sum_{m=1}^{M}x_{m,k}D_m}\left(W - \ln 2 \cdot \frac{1}{t'_{tran}}\sum_{k=n}^{N}\sum_{m=1}^{M}x_{m,k}D_m\right) = 0$$

S44, based on the upper limit $t_{tran}^{up}$ of the transmission delay and the lower limit $t_{tran}^{low}$ of the transmission delay between the local terminal and the idle terminals, the optimal transmission delay function $t^*_{tran}$ is determined:

if $t_{tran}^{up} \geq t_{tran}^{low}$, it means that there is $t_{tran}$ which can make loaded computing tasks be completed within the constraint time, then it will be discussed as follows:
(1) if $t_{tran}^{up} \geq t_{tran}^{low}$ and $t_{tran}^{low} \leq t'_{tran}$, $t^*_{tran} = \min\{t'_{tran}, t^*_{tran}\}$;
(2) if $t_{tran}^{up} \geq t_{tran}^{low}$ and $t_{tran}^{low} > t'_{tran}$, $t^*_{tran} = t_{tran}^{low}$;
if $t_{tran}^{up} < t_{tran}^{low}$, it means that at present, there are some of loaded computing tasks which cannot be completed on time, then it will be discussed as follows:

$$\text{if } t_{tran}^{up} < t_{tran}^{low} \text{ and } \max_{m \in \Gamma}\{L_m - t'_m\} < t_{tran}^{low}, \quad (3)$$

it means that all the unloaded computing tasks cannot be completed within the delay limit, then $t'_{tran} = \max\{t_{tran}^{low}, t'_{tran}\}$;

$$\text{if } t_{tran}^{up} < t_{tran}^{low} \text{ and } \max_{m \in \Gamma}\{L_m - t'_m\} \geq t_{tran}^{low}, \quad (4)$$

it means that part of the computing tasks can be completed within the delay constraint, and for the computing tasks that can be completed on time, according to the step S41, the upper limit of the transmission delay between the local terminal and the idle terminals is recalculated and is recorded as $t_{tran}^{up*}$;
(1) if $t_{tran}^{up*} < t'_{tran}$, $t^*_{tran} = t_{tran}^{up*}$;
(2) if $t_{tran}^{up*} \geq t'_{tran}$, $t^*_{tran} = \max\{t_{tran}^{low}, t'_{tran}\}$;
S45, the processing delay $t^*_m$ of the computing task $T_m$ based on the optimal transmission delay function $t^*_{tran}$ is obtained by bringing the optimal transmission delay function $t^*_{tran}$ into the processing delay $t^*_m$ expression of the computing task $T_m$, and based on the total overhead objective function of the local terminal corresponding to the decision samples, the total overhead of the local terminal corresponding to the decision samples is obtained as follows:

$$\alpha \max t^*_m + \beta E_{loc} + \gamma \sum_{n=1}^{N} Mon_n + \sigma \max_{m \in \{1,2,\ldots M\}}\left\{\frac{\max\{t^*_m - L_m, 0\}}{|t^*_m - L_m|}\right\}, \quad 60$$

where $\sigma$ represents a preset penalty value, if there are computing tasks that cannot be completed on time, the preset penalty value $\sigma$ is added based on the total overhead objective function of the local terminal corresponding to the decision samples.

According to the multi-task joint computing unloading and resource allocation method based on D2D (Device-to-Device) communication disclosed by the embodiment of the present disclosure, the specific steps of selecting the decision samples that minimize the total overhead of the local terminal with the goal of minimizing the total overhead of the local terminal through a preset number of iterations and completing the allocation of the computing tasks on the local terminal in step S5 are as follows:

S51, different decision samples are used to participate in the iterations, the computing tasks on the local terminal are allocated according to the decision samples, the maximum number of iterations is preset, whether the preset maximum number of iterations is reached is determined, and if the preset maximum number of iterations is reached, the decision samples in each iteration that minimize the total overhead of the local terminal are selected to allocate the computing tasks on the local terminal are allocated;

if the preset maximum number of iterations is not reached, step S52 is performed;

S52, cross-operation is performed in the decision samples: two decision samples are randomly selected from the decision samples and are marked as $A_1$ and $A_2$, the decision samples reflect the execution decision of each task, N+1 columns of vectors in the decision samples are regarded as chromosomes, each chromosome contains M elements which correspondingly represent the execution condition of M tasks on the local terminal or the idle terminals, the decision samples $A_1$ and $A_2$ are respectively marked as a parent individual 1 and a parent individual 2, the positions of the chromosome and the position of a crossing node on the chromosome are randomly selected, and the expression is as follows:

$(\theta_1, \theta_2)$ where $\theta_1$ represents the position of the chromosome in the parent individual to which the chromosome belongs, and $\theta_2$ represents the position of the crossing node in the chromosome; based on this position, a cross interchange is performed, first $\theta_2$ elements on first $\theta_1-1$ columns and a $\theta_1$-th column of the parent individual 1 and last M–$\theta_2$ elements on last N+1–81 columns and a $\theta_1$-th column of the parent individual 2 are combined to generate a new individual 1, last M–$\theta_2$ elements on last N+1–$\theta_1$ columns and a $\theta_1$-th column of the parent individual 1 and first $\theta_2$ elements on first $\theta_1$– 1 columns and a $\theta_1$-th column of the parent individual 2 are combined to generate a new individual 2, and the two new individuals are generated and are respectively marked as an offspring individual 1 and an offspring individual 2;

after each cross-operation is completed, whether each offspring individual satisfies $\Sigma_{n=0}^{N}x_{m,n}=1$ is checked, if $\Sigma_{n=0}^{N}x_{m,n}=0$, it means that the computing tasks are missing, for the missing computing tasks, the idle terminals or the local terminal which can execute the missing computing tasks are randomly selected, if $\Sigma_{n=0}^{N}x_{m,n}>1$, it means that the computing tasks are repeated, the idle terminals or the local terminal which can execute the repeated computing tasks are randomly selected;

S53, the mutation operation is implemented in the decision samples: based on the decision samples in the completed iterations, the decision samples that minimize the total overhead of the local terminal do not participate in the mutation operation, for other decision samples, the mutation operation is performed with a preset probability m̂, for the matrix corresponding to the decision sample, the position of the chromosome and the position of a mutation element on the chromosome are randomly selected, and the expression is as follows:

$(\theta_3, \theta_4)$ where $\theta_3$ represents the position of the chromosome in the individual to which the chromosome belongs, and $\theta_4$ represents the position of the mutant element on the chromosome;

$x_{(\theta_3, \theta_4)}$ represent the value of the element on the chromosome, if $x_{(\theta_3, \theta_4)}=1$, the value of the element is modified to 0, and the idle terminal or local terminal that executes the computing task to which the element corresponds is randomly selected, if $x_{(\theta_3, \theta_4)}=0$, the value of the element is modified to 1, the computing task to which the element corresponds is removed from the idle terminal or the local terminal that originally executed the computing task; and S54, for the decision samples, and other decision samples obtained through cross-operation and mutation operation, the total overhead of the local terminal corresponding to the decision samples is calculated, and the optimal original population number of samples are selected to build a sample group to participate in iterations until the preset maximum number of iterations is reached.

The embodiments of the present disclosure are described above in detail with reference to the accompanying drawings, but the present disclosure is not limited to the above embodiments, and various changes can be made without departing from the purposes of the present disclosure and within the scope of knowledge of those ordinary skill in the art.

What is claimed is:

1. A multi-task joint computing unloading and resource allocation method based on D2D (Device-to-Device) communication, wherein the specific steps of constructing decision samples are as follows: S1. detecting idle terminals in a preset range by taking a local terminal as a center, and computing power fn energy consumption pricing $\varphi_n$, maximum allowable energy consumption $E_{max}^n$, and channel state $g_n$ of the idle terminals are obtained, wherein $n \in \{1,2, \ldots, N\}$, and N represents the total number of the idle terminals;

S2. constructing decision samples based on an execution mode of computing tasks on the local terminal;

S3. respectively for the decision samples, determining a total overhead objective function and constrain conditions of the local terminal corresponding to the decision samples, based on a processing delay function $t_m$ of the computing tasks, wherein $m \in \{1,2, \ldots, M\}$, M represents the total number of the computing tasks, a total computing energy consumption function $E_{loc}$ for local terminal processing the computing tasks assigned by the decision tasks, a transmission energy consumption function $E_n^{tran}$ for the idle terminals involved in the decision samples respectively receiving the computing tasks assigned by the decision samples, wherein $n \in \{1,2, \ldots, N\}$, N represents the total number of the idle terminals, and a fee charging function for the idle terminals respectively receiving the computing tasks of the local terminal;

S4. respectively for the decision samples, calculating an upper limit of a transmission delay between the local terminal corresponding to the decision samples and the idle terminals, calculating a lower limit of a delay between the local terminal and the idle terminals, and determining an optimal transmission delay function corresponding to the decision samples under constraint conditions;

respectively for the decision samples, calculating a total overhead of the local terminal corresponding to the decision samples based on the total overhead objective function, the constraint conditions of the local terminal corresponding to the decision samples, and the optimal transmission delay function corresponding to the decision samples under the constraint conditions; and S5. selecting the decision samples that minimize the total overhead of the local terminal with the goal of minimizing the total overhead of the local terminal through a preset number of iterations, and completing an allocation of the computing tasks on the local terminal based on the decision samples;

wherein the specific steps of constructing decision samples in step S2 are as follows:

S21, computing tasks on the local terminal are represented by a set $\Gamma = \{T_1, T_2, \ldots T_M\}$, wherein the total number of the computing tasks is represented by M; the attributes of the computing tasks are represented by a set $\{C_m, D_m, L_m\}$, wherein $C_m$ represents the total number of CPU (central processing unit) cycles required to process the computing tasks, $D_m$ represents the data volume of the computing tasks, $L_m$ represents the maximum delay allowed by the computing tasks, wherein $m \in \{1,2, \ldots, M\}$, and M represents the total number of computing tasks;

S22, the idle terminals are sorted and numbered in descending order according to channel gains thereof, the channel gains of the idle terminals satisfy the requirement of $g_1 \geq \ldots \geq g_n \geq \ldots \geq g_N$, wherein $g_n$ represents the channel gain of one of the idle terminals, $n \in \{1,2, \ldots, N\}$, N represents the total number of the idle terminals, and the idle terminals are presented by a set $\Lambda = \{1,2, \ldots, N\}$;

S23, respectively for one computing task $T_m$ among the computing tasks on the local terminal, wherein $m \in \{1, 2, \ldots, M\}$, and M represents the total number of the computing tasks, the execution mode of the computing task $T_m$ is constructed as follows:

$\{x_{m,0}, x_{m,1}, \ldots, x_{m,n}, \ldots, x_{m,N}\}$ wherein $x_{m,n}$ represents the execution mode of the computing task $T_m$, wherein $n \in \{1,2, \ldots, N\}$, N represents the total number of idle terminals, $x_{m,0}=1$ represents that the computing task $T_m$ is processed at the local terminal, $x_{m,0}=0$ represents that the computing task $T_m$ is not processed at the local terminal, $x_{m,n}=1$ represents that computing task $T_m$ is unloaded to the idle terminal n for processing, $x_{m,n}=0$ represents that the computing task $T_m$ is not processed on the idle terminal n, and the execution mode of each computing task in computing task sets on the local terminal satisfies $\Sigma_{n=0}^{N} x_{m,n}=1$; and S24, respectively for the computing tasks on the local terminal, constructing the decision samples based on the execution mode of the computing tasks on the local terminal, each of the decision samples is represented by a matrix A with M rows and N+1 columns, and the matrix A is as follows:

$$A = \begin{pmatrix} x_{1,0} & x_{1,1} & x_{1,2} & \ldots & x_{1,N} \\ x_{2,0} & x_{2,1} & x_{2,2} & \ldots & x_{2,N} \\ \vdots & \vdots & \vdots & \vdots & \vdots \\ x_{M,0} & x_{M,1} & x_{M,2} & \ldots & x_{M,N} \end{pmatrix}$$

wherein the first column in the matrix A represents the execution condition of the computing tasks on the local terminal, and the second column to the (N+1)-th column represent the execution condition of the computing tasks unloaded to the idle terminals.

2. The multi-task joint computing unloading and resource allocation method based on D2D (Device-to-Device) communication according to claim 1, wherein the specific steps of determining the total overhead objective function and constraint conditions of the local terminal in step 3 are as follows:

S31. respectively for each decision sample, the number of computing tasks on the local terminal and the idle terminals is represented by a set $\{K_0, K_1, \ldots, K_N\}$, and the computing tasks on the local terminal are arranged in descending order according to the maximum allowable delay $L_m$, and are represented by a set $S_0 = \{S_{0,1}, S_{0,2}, \ldots, S_{0,K_0}\}$; the computing tasks on the idle terminal n are arranged in descending order according to the maximum allowable delay $L_m$, and are represented by a set $S_n = \{S_{n,1}, S_{n,2}, \ldots, S_{n,K_n}\}$;

S32. the total computing energy consumption function $E_{loc}$ for the local terminal processing the computing tasks assigned by the decision tasks is calculated, and the transmission energy consumption function $E_n^{tran}$ for the idle terminals involved in the decision samples respectively receiving the computing tasks assigned by the decision samples are as follows:

$$E_{loc} = \sum_{m=1}^{M} x_{m,0} \mu C_m$$

$$E_n^{tran} = t_{tran} \cdot P^{tot}$$

where $\mu$ represents the energy consumed in each CPU cycle, $t_{tran}$ represents the transmission time for the local terminal to unload the computing tasks to the idle terminals, and $P^{tot}$ represents the minimum total transmission power of the local terminal;

wherein the decision x is executed based on the computing tasks corresponding to the decision samples, and the relationship between the transmission time $t_{tran}$ for the local terminal to unload the computing tasks to the idle terminals and the minimum total transmission power $P^{tot}$ of the local terminal is as follows:

$$P^{tot}(x, t_{tran}) = Wn_0 \sum_{n=1}^{N} \left( \frac{1}{g_n} - \frac{1}{g_{n-1}} \right) 2^{\frac{1}{t_{tran}W} \sum_{k=n}^{N} \sum_{m=1}^{M} x_{m,k} D_m} - \frac{Wn_0}{g_n}$$

where $g_n$ represents the n-th idle terminal, $g_{n-1}$ represents the (n−1)-th idle terminal, $g_N$ represents the N-th idle terminal, and $g_{n-1} \geq g_n \geq g_N$, W represents the bandwidth of a transmission channel, $n_0$ represents the power spectral density of white noise, and k represents the serial number of the idle terminal;

S33, one computing task $T_m$ among the computing tasks on the local terminal is unloaded to the idle terminal n, and the expression of the processing delay $t_m$ of the computing task $T_m$ is as follows:

$$t_m = \begin{cases} \sum_{i=S_{0,1}}^{S_0(m)} \frac{C_i}{f_{loc}} & x_{m,n} = 1, n = 0 \\ t_{tran} + \sum_{i=S_{n,1}}^{S_n(m)} \frac{C_i}{f_n} & x_{m,n} = 1, n \in \Lambda \end{cases}$$

where $f_{loc}$ represents the computing power of the local terminal, $f_n$ represents the computing power of the idle terminals, $S_n(m)$ represents the position of the computing task $T_m$ in the set $S_n$, $S_0(m)$ represents the position of the computing task $T_m$ in the set $S_0$ and i represents the serial number of the computing tasks in the set $S_0$ or the $S_n$;

S34, a fee-charging function $Mon_n$ for the idle terminals respectively receiving the computing tasks of the local terminal is calculated as follows:

$$Mon_n = \varphi_n \log_2 \left( 1 + \sum_{i=S_{n,1}}^{S_{n,K_n}} \mu C_i \right)$$

where $\varphi_n$ represents the pricing of unit energy consumption of the idle terminal n;

S34, based on the processing delay $t_m$ of the computing task $T_m$, the total computing energy consumption function $E_{loc}$ for the local terminal processing the computing tasks assigned by the decision tasks, the transmission energy consumption function $E_n^{tran}$ for the idle terminals involved in the decision samples respectively receiving the computing tasks assigned by the decision samples, and the fee-charging function $Mon_n$ for the idle terminals respectively receiving the computing tasks of the local terminal, the total overhead objective function of the local terminal corresponding to the decision samples is determined as follows:

$$\underset{x, t_{tran}}{\text{minimize}} \; \alpha \max t_m + \beta (E_{loc} + E_n^{tran}) + \gamma \sum_{n=1}^{N} Mon_n$$

constraint conditions are as follows:
(1) $t_m \leq L_m \; \forall m \in \{1, 2, \ldots, M\}$
(2) $\sum_{m=S_{n,1}}^{S_{n,K_n}} \mu C_m \leq E_{max}^n \; \forall n \in \Lambda$
(3) $P^{tot} \leq P_{max}$
(4) $\alpha + \beta + \gamma = 1$
(5) $\alpha, \beta, \gamma \in (0, 1), t_{tran} > 0, x_{m,n} \in \{0,1\}$
where $P_{max}$ represents the maximum transmission power of the local terminal, $E_{max}^n$ represents the maximum allowable energy consumption of the idle terminal n, and $\alpha, \beta$, and $\gamma$ respectively represent the weight coefficients of the local terminal for the processing delay, the energy consumption, and the fee charging corresponding to the idle terminals respectively receiving the computing tasks of the local terminal.

3. The multi-task joint computing unloading and resource allocation method based on D2D (Device-to-Device) communication according to claim 2, wherein the specific steps of determining the optimal transmission delay function corresponding to the decision samples in step S4 are as follows:

S41, respectively for each decision sample, the upper limit $t_{tran}^{up}$ of transmission delay between the local terminal and the idle terminals is calculated as follows:

$$t_{tran}^{up} = \min_{n \in \Lambda}\{\Delta_n\}$$

where $\Delta_n$ represents the upper limit of the transmission delay between the local terminal and the idle terminal n and is specifically shown in the following formula:

$$\Delta_n = \min_{m \in S_n}\{L_m - t'_m\}$$

where $t'_m$ represents the delay of the computing task $T_m$ on the local terminal or the idle terminals, and is specifically shown in the following formula:

$$t'_m = \begin{cases} \sum_{i=S_{0,1}}^{S_0(m)} \dfrac{C_i}{f_{loc}} & x_{m,0} = 1 \\ \sum_{i=S_{n,1}}^{S_n(m)} \dfrac{C_i}{f_n} & x_{m,n} = 1, n \in \Lambda \end{cases}$$

S42, based on the maximum transmission power $P_{max}$ of the local terminal, the lower limit $t_{tran}^{low}$ of transmission delay between the local terminal and the idle terminals is calculated according to the following formula:

$$P_{max} - Wn_0 \sum_{n=1}^{N}\left(\dfrac{1}{g_n} - \dfrac{1}{g_{n-1}}\right) 2^{\frac{1}{t_{tran}^{low}W} \sum_{k=n}^{N}\sum_{m=1}^{M}x_{m,k}D_m} - \dfrac{Wn_0}{g_N} = 0$$

S43, based on the maximum transmission power $P_{max}$ of the local terminal, the transmission delay $t'_{tran}$ which minimizes the total overhead of the local terminal corresponding to the decision samples is calculated according to the following formula:

$$\alpha - \beta \dfrac{Wn_0}{g_N} + \beta n_0$$

$$\sum_{n=1}^{N}\left(\dfrac{1}{g_n} - \dfrac{1}{g_{n-1}}\right) 2^{\frac{1}{t'_{tran}W}\sum_{k=n}^{N}\sum_{m=1}^{M}x_{m,k}D_m}\left(W - \ln 2 \cdot \dfrac{1}{t'_{tran}}\sum_{k=n}^{N}\sum_{m=1}^{M}x_{m,k}D_m\right) = 0$$

S44, based on the upper limit $t_{tran}^{up}$ of the transmission delay and the lower limit $t_{tran}^{low}$ of the transmission delay between the local terminal and the idle terminals, the optimal transmission delay function $t^*_{tran}$ is determined:

if $t_{tran}^{up} \geq t_{tran}^{low}$ and $t_{tran}^{low} \leq t'_{tran}$, $t^*_{tran} = \min\{t'_{tran}, t_{tran}^{up}\}$;  (1)

if $t_{tran}^{up} \geq t_{tran}^{low}$ and $t_{tran}^{low} > t'_{tran}$, $t^*_{tran} = t_{tran}^{low}$;  (2)

if $t_{tran}^{up} < t_{tran}^{low}$ and $\max_{m \in \Gamma}\{L_m - t'_m\} < t_{tran}^{low}$, $t^*_{tran} = \max\{t_{tran}^{low}, t'_{tran}\}$  (3)

if $t_{tran}^{up} < t_{tran}^{low}$ and $\max_{m \in \Gamma}\{L_m - t'_m\} \geq t_{tran}^{low}$,  (4)

according to the step S41, the transmission delay upper limit between the local terminal and the idle terminals is recalculated and is recorded as $t_{tran}^{up*}$;

(1) if $t_{tran}^{up*} < t'_{tran}$, $t^*_{tran} = t_{tran}^{up*}$;

(2) if $t_{tran}^{up*} \geq t'_{tran}$, $t^*_{tran} = \max\{t_{tran}^{low}, t'_{tran}\}$;

S45, the processing delay $t^*_m$ of the computing task $T_m$ based on the optimal transmission delay function $t^*_{tran}$ is obtained by bringing the optimal transmission delay function $t^*_{tran}$ into the processing delay $t^*_m$ expression of the computing task $T_m$, and based on the total overhead objective function of the local terminal corresponding to the decision samples, the total overhead of the local terminal corresponding to the decision samples is obtained as follows:

$$\alpha \max t^*_m + \beta E_{loc} + \gamma \sum_{n=1}^{N} Mon_n + \sigma \max_{m \in \{1,2,\ldots,M\}}\left\{\dfrac{\max\{t^*_m - L_m, 0\}}{|t^*_m - L_m|}\right\}$$

where $\sigma$ represents a preset penalty value.

4. The multi-task joint computing unloading and resource allocation method based on D2D (Device-to-Device) communication according to claim 3, wherein the specific steps of selecting the decision samples that minimize the total overhead of the local terminal with the goal of minimizing the total overhead of the local terminal through a preset number of iterations and completing the allocation of the computing tasks on the local terminal in step S5 are as follows:

S51, different decision samples are used to participate in the iterations, the computing tasks on the local terminal are allocated according to the decision samples, the maximum number of iterations is preset, whether the preset maximum number of iterations is reached is determined, and if the preset maximum number of iterations is reached, the decision samples in each iteration that minimize the total overhead of the local terminal in each iteration are selected to allocate the computing tasks on the local terminal are allocated;

if the preset maximum number of iterations is not reached, step S52 is performed;

S52, cross-operation is performed in the decision samples: two decision samples are randomly selected from the decision samples and are marked as $A_1$ and $A_2$, the decision samples reflect the execution decision of each task, N+1 columns of vectors in the decision samples are regarded as chromosomes, each chromosome contains M elements which correspondingly represent the execution condition of M tasks on the local terminal or the idle terminals, the decision samples $A_1$ and $A_2$ are respectively marked as a parent individual 1 and a parent individual 2, the positions of the chromosome and the position of a crossing node on the chromosome are randomly selected, and the expression is as follows:

$(\theta_1, \theta_2)$ where $\theta_1$ represents the position of the chromosome in the parent individual to which the chromosome belongs, and $\theta_2$ represents the position of the crossing node in the chromosome; based on this position, a cross interchange is performed, first $\theta_2$ elements on first $\theta_1-1$ columns and a $\theta_1$-th column of the parent individual 1 and last M−$\theta_2$ elements on last N+1−81 columns and a $\theta_1$-th column of the parent individual 2 are combined to generate a new individual 1, last M−$\theta_2$ elements on last N+1−$\theta_1$ columns and a $\theta_1$-th column of the parent individual 1 and first $\theta_2$ elements on first $\theta_1-1$ columns and a $\theta_1$-th column of the parent individual 2 are combined to generate a new individual 2, and the two new individuals are generated and are respectively marked as an offspring individual 1 and an offspring individual 2;

after each cross-operation is completed, whether each offspring individual satisfies $\Sigma_{n=0}^{N} x_{m,n}=1$ is checked, if $\Sigma_{n=0}^{N} x_{m,n}=0$, it means that the computing tasks are missing, for the missing computing tasks, the idle terminals or the local terminal which can execute the missing computing tasks are randomly selected, if $\Sigma_{n=0}^{N} x_{m,n}>1$, it means that the computing tasks are repeated, the idle terminals or the local terminal which can execute the repeated computing tasks are randomly selected;

S53, the mutation operation is implemented in the decision samples: based on the decision samples in the completed iterations, the decision samples that minimize the total overhead of the local terminal do not participate in the mutation operation, for other decision samples, the mutation operation is performed with a preset probability $\hat{m}$, for the matrix corresponding to the decision sample, the position of the chromosome and the position of a mutation element on the chromosome are randomly selected, and the expression is as follows:

$(\theta_3, \theta_4)$ where $\theta_3$ represents the position of the chromosome in the individual to which the chromosome belongs, and $\theta_4$ represents the position of the mutant element on the chromosome;

$x_{(\theta_3, \theta_4)}$ represent the value of the element on the chromosome, if $x_{(\theta_3, \theta_4)}=1$, the value of the element is modified to 0, and the idle terminal or local terminal that executes the computing task to which the element corresponds is randomly selected, if $x_{(\theta_3, \theta_4)}=0$, the value of the element is modified to 1, the computing task to which the element corresponds is removed from the idle terminal or the local terminal that originally executed the computing task; and S54, for the decision samples, and other decision samples obtained through cross-operation and mutation operation, the total overhead of the local terminal corresponding to the decision samples is calculated, and the optimal original population number of samples are selected to build a sample group to participate in iterations until the preset maximum number of iterations is reached.

* * * * *